(12) United States Patent
Toyota et al.

(10) Patent No.: US 8,864,328 B2
(45) Date of Patent: Oct. 21, 2014

(54) ILLUMINATION DEVICE AND VEHICLE HEADLIGHT

(75) Inventors: Kensei Toyota, Osaka (JP); Hiroshi Kijima, Osaka (JP); Koji Takahashi, Osaka (JP)

(73) Assignee: Sharp Kabushiki Kaisha, Osaka-shi (JP)

( * ) Notice: Subject to any disclaimer, the term of this patent is extended or adjusted under 35 U.S.C. 154(b) by 174 days.

(21) Appl. No.: 13/554,837

(22) Filed: Jul. 20, 2012

(65) Prior Publication Data

US 2013/0027964 A1 Jan. 31, 2013

(30) Foreign Application Priority Data

Jul. 25, 2011 (JP) ................................. 2011-162606

(51) Int. Cl.
*F21V 9/16* (2006.01)
*F21S 8/10* (2006.01)
*F21V 8/00* (2006.01)

(52) U.S. Cl.
CPC ......... *F21S 48/1145* (2013.01); *F21S 48/1241* (2013.01); *G02B 6/0008* (2013.01)
USPC .............. 362/84; 362/511; 362/554; 362/583

(58) Field of Classification Search
CPC .. G02B 6/0006; G02B 6/0005; G02B 6/0008; G02B 6/4296; G02B 6/4204; F21S 48/1241; F21S 48/2237; F21Y 2101/02; F21Y 2101/025; F21K 2/00; F21K 9/00

USPC ................... 362/553, 554, 583, 511, 259, 84; 385/59, 71; 359/326

See application file for complete search history.

(56) References Cited

U.S. PATENT DOCUMENTS

| | | | |
|---|---|---|---|
| 7,128,431 B2 * | 10/2006 | Ludewig et al. ................. | 362/26 |
| 7,780,326 B2 * | 8/2010 | Ito ................................. | 362/554 |
| 8,197,111 B2 * | 6/2012 | Hama et al. .................... | 362/555 |
| 2005/0105301 A1 | 5/2005 | Takeda et al. | |
| 2008/0037933 A1 * | 2/2008 | Furman et al. .................. | 385/31 |
| 2008/0239748 A1 * | 10/2008 | Hatzenbuehler et al. ..... | 362/554 |
| 2009/0067188 A1 * | 3/2009 | Wako et al. .................... | 362/553 |
| 2009/0296018 A1 * | 12/2009 | Harle et al. ..................... | 349/61 |
| 2011/0141763 A1 * | 6/2011 | Kamee et al. .................. | 362/583 |
| 2012/0217418 A1 * | 8/2012 | Levatter et al. ............ | 250/461.1 |

FOREIGN PATENT DOCUMENTS

| | | |
|---|---|---|
| JP | 2003-295319 | 10/2003 |
| JP | 2005-150041 | 6/2005 |

* cited by examiner

*Primary Examiner* — Peggy Neils
(74) *Attorney, Agent, or Firm* — Morrison & Foerster LLP

(57) ABSTRACT

In a head lamp 1, relative positions of a laser light guide path in a tapered light guide section 20 and a parabolic mirror 5 are fixed. An optical fiber 10 and the tapered light guide section 20 are each provided so as to have a receiving end part where laser light is received and an emitting end part where laser light is emitted. The emitting end part of the optical fiber 10 is located near the receiving end part of the tapered light guide section 20.

11 Claims, 10 Drawing Sheets

ILLUMINATION DEVICE AND VEHICLE HEADLIGHT

This nonprovisional application claims priority under 35 U.S.C. §119 on Patent Application No. 2011-162606 filed in Japan on Jul. 25, 2011, the entire contents of which are hereby incorporated by reference.

TECHNICAL FIELD

The present invention relates to illumination devices and vehicle headlights which are capable of projecting emission light onto a fixed position.

BACKGROUND ART

Increasing research activities have been under way recently to develop illumination devices in which an excitation light source generates excitation light which is then projected to a light emitting section containing a fluorescent material so that the material can emit illumination light. The excitation light source here is a semiconductor-based light emitting element, such as an LED (light emitting diode) or an LD (laser diode).

For example, Patent Literatures 1 and 2 disclose technology related to such illumination devices.

Patent Literature 1 discloses a lamp device which includes a first optical member (lens), a second optical member (reflector), and a fluorescent material. In the lamp device, the first optical member converges excitation light from a light source (laser diode) which is then projected to a fluorescent material, so as to emit high luminance light from a small region. This mechanism ensures brightness of a hotspot (a part, of an alignment region, which needs to be illustrated brightly). Patent Literature 1 also describes an example where the lamp device is arranged to guide the excitation light to the first optical member through an optical fiber.

Patent Literature 2 discloses a light source device including: a laser diode which emits short-wavelength laser light; a collimator lens which collimates the laser light from the laser diode so as to form parallel fluxes of light; a condenser which converges the laser light, now in the form of parallel fluxes of light, from the collimator lens; and a fluorescent material which absorbs the laser light converged by the condenser and spontaneously emits incoherent light.

CITATION LIST

Patent Literature

Patent Literature 1
Japanese Patent Application Publication, Tokukai, No. 2005-150041A (Published Jun. 9, 2005)
Patent Literature 2
Japanese Patent Application Publication, Tokukai, No. 2003-295319A (Published Oct. 15, 2003)

SUMMARY OF INVENTION

Technical Problem

The conventional technology has following problems.

Specifically, Patent Literature 1 does not disclose an arrangement of a lamp device where (1) the first optical member (lens) and the second optical member (reflector) are fixed integrally, and (2) the light source section has an emission port for excitation light near a lens. In a case where the components of the lamp device of Patent Literature 1 move out of place due to, for example, vibration, the excitation light is not guided to reach the lens, and the projection of the excitation light onto the fluorescent material becomes unstable because the lens and the reflector can be displaced individually or the lens can be thus arranged far from an emitting end part of the light source section for the excitation light. As a result, the excitation light is not illuminated in a stable manner, and desired distribution of light becomes unsustainable. This is a problem commonly found among lamp devices, irrespective of whether the light source is or is not an excitation light source.

The light source device of Patent Literature 2 includes two light guide sections (lenses 3 and 5 in FIG. 1) between the laser diode and the fluorescent material. The lens 3 is inflexible and does not have its emitting end part near a receiving end part of the lens 5. Therefore, in a case where the lenses 3 and 5 or other components move out of place due to, for example, vibration, the light source device of Patent Literature 2 likewise becomes unable to illuminate laser light in a stable manner and fails to sustain desired distribution of light.

The present invention, conceive to address these problems, has an object of providing an illumination device and a vehicle headlight which are capable of projecting emission light in a stable manner.

Solution to Problem

An illumination device in accordance with the present invention, to address the problems, includes: a first light guide section and a second light guide section, which guide emission light emitted from a light source; a light conversion section converting the emission light which has been guided by the first and second light guide sections to illumination light; and a light distribution section controlling distribution of the illumination light thus converted, the first light guide section having flexibility and guiding the emission light to the second light guide section, a light guide path for the emission light in the second light guide section and the light distribution section being provided so as to be fixed relative to each other, the first and second light guide sections each having (i) a receiving end part where emission light is received and (ii) an emitting end part where emission light is emitted, the emitting end part of the first light guide section being provided near the receiving end part of the second light guide section.

In the illumination device in accordance with the present invention, the second light guide section is arranged so that the light guide path in the second light guide section is located so as to be fixed relative to the light distribution section. In other words, the second light guide section is fixed to the light distribution section in the present illumination device. Therefore, even in a case where the illumination device is subjected to, for example, vibration, the second light guide section and the light distribution section move as a single body. The present illumination device does not allow the light guide path to be displaced relative to the light distribution section, hence achieving stable projection of emission light onto the light conversion section so as to sustain stable distribution of light.

Furthermore, in the present illumination device, the emitting end part of the first light guide section is provided near the receiving end part of the second light guide section. Therefore, even in a case where the first light guide section and the second light guide section are displaced, the emission light emitted from the first light guide section can be received by the second light guide section in a stable manner. The present illumination device can thus reduce loss of emission light.

In addition, since the present illumination device includes the first light guide section and the second light guide section, the light source and the light conversion section can be separated by a fixed distance. The distance enables dispersion of heat generated by the light source and the light conversion section. Furthermore, since the first light guide section is flexible, the location (layout) of the light source is given improved freedom.

Advantageous Effects of Invention

An illumination device in accordance with the present invention, as described in the foregoing, includes: a first light guide section and a second light guide section, which guide emission light emitted from a light source; a light conversion section converting the emission light which has been guided by the first and second light guide sections to illumination light; and a light distribution section controlling distribution of the illumination light thus converted, the first light guide section having flexibility and guiding the emission light to the second light guide section, a light guide path for the emission light in the second light guide section and the light distribution section being provided so as to be fixed relative to each other, the first and second light guide sections each having (i) a receiving end part where emission light is received and (ii) an emitting end part where emission light is emitted, the emitting end part of the first light guide section being provided near the receiving end part of the second light guide section.

Therefore, the illumination device in accordance with the present invention brings about an effect of achieving stable projection of emission light.

For a fuller understanding of the nature and advantages of the invention, reference should be made to the ensuing detailed description taken in conjunction with the accompanying drawings.

BRIEF DESCRIPTION OF DRAWINGS

FIG. 6(a) illustrates an example of a tapered light guide section with a quadrangular pyramidal trapezoid shape being held by holding members at a point on each face of the tapered light guide section. FIG. 6(b) illustrates an example of a tapered light guide section with a quadrangular pyramidal trapezoid shape being held by a holding member on four corners (edges) of the tapered light guide section. FIG. 6(c) illustrates an example of a tapered light guide section with a quadrangular pyramidal trapezoid shape being held by a holding member at a point on each bevel of the tapered light guide section, the bevels being made by cutting off four corners of the light guide section.

FIG. 10(a) illustrates an example of a light guide section of rod type with a rectangular parallelepiped shape being held by holding members at a point on each face of the light guide section of rod type. FIG. 10(b) illustrates an example of a light guide section of rod type being held by a holding member on four corners (edges) of the light guide section of rod type. FIG. 10(c) illustrates an example of a light guide section of rod type with a rectangular parallelepiped shape being held by a holding member at a point on each bevel of the light guide section of rod type, the bevels being made by cutting off four corners of the light guide section.

DESCRIPTION OF EMBODIMENTS

Figure 1:
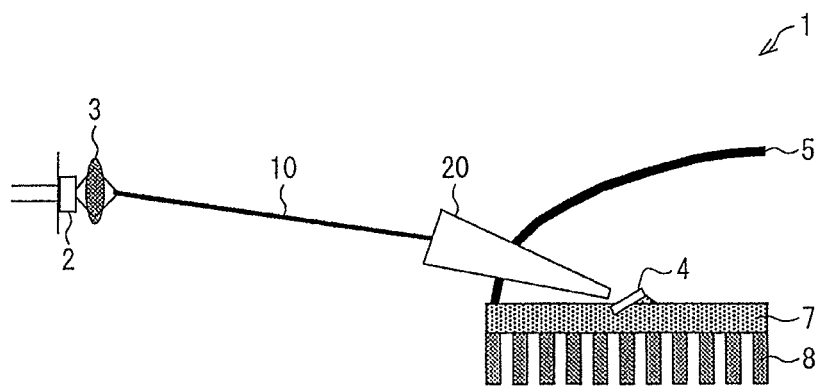
FIG. 1 is a cross-sectional view of a schematic arrangement of a head lamp in accordance with an embodiment of the present invention.

The following will describe a head lamp 1, etc. in accordance with the present embodiment in reference to drawings. Note that, in the following description, identical reference numerals/symbols are given to respective identical components/constituent elements which have identical names and functions. Therefore, their detailed descriptions will not be repeated.

[Arrangement of Head Lamp 1]

FIG. 1 is a cross-sectional view of a schematic arrangement of a head lamp 1 in accordance with an embodiment of the present invention. As illustrated in FIG. 1, the head lamp 1 includes a laser element (light source) 2, a condenser lens 3, a light emitting section (light conversion section) 4, a parabolic mirror (light distribution section) 5, a metal base 7, a fin 8, an optical fiber (first light guide section) 10, and a tapered light guide section (second light guide section) 20.

(Laser Element 2)

The laser element 2 is a light emitting element which acts as an excitation light source for emitting excitation light. The laser element 2 can be replaced with a plurality of laser elements 2. In this case, each of the plurality of laser elements 2 outputs laser light as excitation light. A single laser element 2 can be employed. It is, however, preferable to use a plurality of laser elements 2 in terms of obtaining high-powered laser light.

The laser element 2 can have a single light emitting point per chip or a plurality of light emitting points per chip. The laser element 2 emits the laser light whose wavelength is, for example, 405 nm (blue violet) or 450 nm (blue). The wavelength is, however, not limited to these and can therefore be suitably selected in accordance with the type of a fluorescent material contained in the light emitting section 4.

Note that a light-emitting diode (LED) can be employed as an excitation light source in place of the laser element. The head lamp 1 is not limited to a light source which emits excitation light. Alternatively, an illumination light source, which emits ordinary illumination light, can be employed as the head lamp 1. Furthermore, the illumination light illuminated outside by the head lamp 1 is not limited to white light and can therefore be pseudo-white light.

(Condenser Lens 3)

The condenser lens 3 causes the laser light emitted from the laser element 2 to enter a receiving end part which is one of two end parts of the optical fiber 10. In a case where two or more laser elements 2 are provided instead of a single laser element 2, a condenser lens 3 is provided for each of the laser elements 2. For example, a FLKN1 405 manufactured by Alps Electric Co., Ltd can be employed as the condenser lens 3. The condenser lens 3 is not limited to a specific shape and a specific material in any particular manner, provided that the lens has the functions discussed above.

(Light Emitting Section 4)

The light emitting section 4 contains a fluorescent material which emits light upon receipt of laser light. As such, the light emitting section 4 emits fluorescence upon receipt of the laser light emitted from the laser element 2. Specifically, the light emitting section 4 is prepared (1) by dispersing a fluorescent material into a sealing material, (2) solidifying a fluorescent material, or (3) depositing fluorescent material particles on a substrate made of a material with high heat conductivity. The light emitting section 4 appears to serve as a wavelength conversion element since it converts laser light to fluorescence.

The light emitting section 4 is provided on the metal base 7 so as to be located in a region in which the parabolic mirror 5 has a focal point.

Examples of the fluorescent material for the light emitting section 4 include oxynitride fluorescent materials (such as sialon fluorescent materials) and III-V compound semiconductor nanoparticle fluorescent materials (such as indium phosphate: InP). These fluorescent materials are most suitable for laser illumination light sources because they have high resistance to heat caused by high-powered (and/or high light density) laser light emitted from the laser element 2. Note, however, that examples of the fluorescent material for the light emitting section 4 are not limited to these and can include another fluorescent material, such as nitride fluorescent material.

As stipulated in the legislation, the head lamp must emit white illumination light with a predetermined range of chroma. For this reason, the light emitting section 4 contains a fluorescent material that is selected to emit such white illumination light.

For example, in a case where (i) the light emitting section 4 contains blue, green, and red fluorescent materials and (ii) the fluorescent materials are irradiated with laser light of 405 nm, the light emitting section 4 emits white light. Alternatively, in a case where (a) the light emitting section 4 contains a yellow fluorescent material (or green and red fluorescent materials) and (b) the yellow fluorescent material is irradiated with laser light of 450 nm (blue) (or so-called near blue laser light whose peak wavelength falls within a wavelength range from 440 nm to 490 nm, inclusive), the light emitting section 4 emits white light.

Examples of the sealing material for the light emitting section 4 include a resin material, such as glass materials (inorganic glass, organic/inorganic hybrid glass, etc.) and silicone resins. A glass with a low melting point can be employed as the glass material. The sealing material preferably has high transparency. The sealing material preferably has high resistance to heat in a case where high-powered laser light is employed.

Note that a scatterer (light conversion section) which diffusely reflects laser light to scatter the laser light can be provided near the focal point of the parabolic mirror 5, in place of the light emitting section 4 which contains a fluorescent material or together with the fluorescent material. Alternatively, the laser light emitted from the laser element can be scattered by the scatterer so as to be directed toward an entire reflecting surface of the parabolic mirror 5. In this case, a plurality of laser elements each having a different oscillation wavelength can be employed in combination so as to illuminate white light. Alternatively, simple illumination light can be employed in place of excitation light.

(Parabolic Mirror 5)

The parabolic mirror 5 reflects (controls) the to fluorescence generated by the light emitting section 4 so as to form fluxes of light (illumination light) traveling within a predetermined solid angle. The parabolic mirror 5 is, for example, a member which is coated with a metal thin film or a member made of metal.

Figure 2:
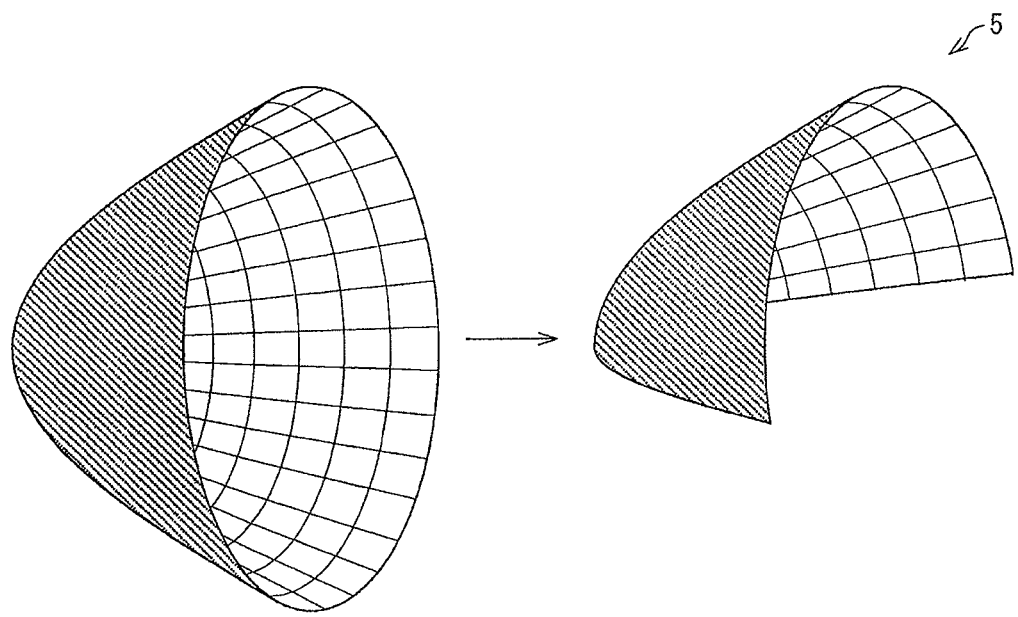
FIG. 2 is a conceptual diagram illustrating a rotary paraboloid of a parabolic mirror.
Figure 3:
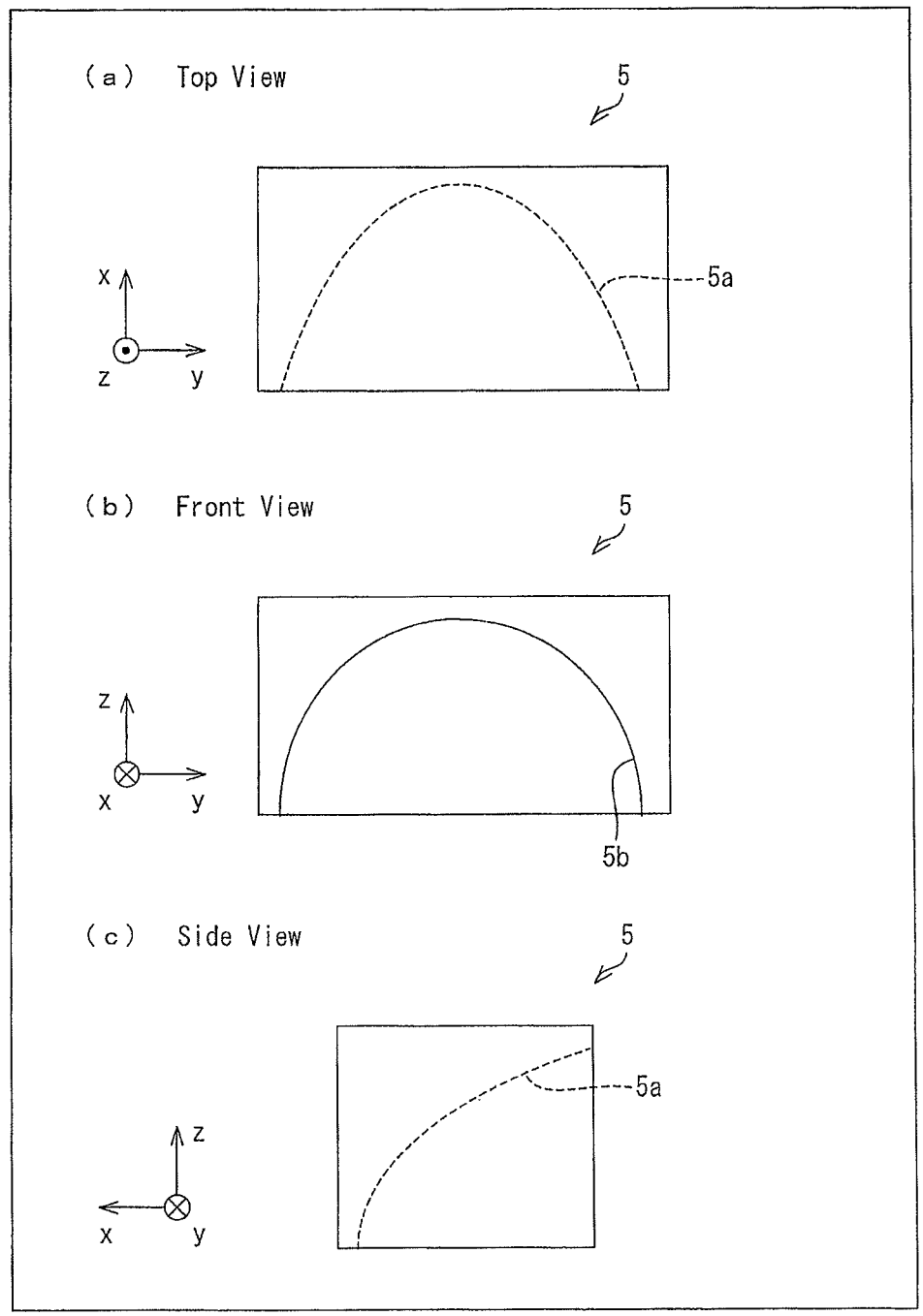
FIG. 3(a) is a top view of a parabolic mirror.
FIG. 3(b) is a front view of the parabolic mirror.
FIG. 3(c) is a side view of the parabolic mirror.

FIG. 2 is a conceptual diagram illustrating a rotary paraboloid of the parabolic mirror 5. FIG. 3(a) through FIG. 3(c) are respectively a top view, a front view, and a side view of the parabolic mirror 5. FIG. 3(a) through FIG. 3(c) illustrate an example in which the parabolic mirror 5 is prepared by hollowing out a rectangular parallelepiped member for the purpose of easy-to-understand illustration.

As illustrated in FIG. 2, at least a part of partially curved surface is a part of a reflecting surface of the parabolic mirror 5. The partially curved surface is obtained by cutting off a curved surface (parabolically curved surface), which is formed by rotating a parabola around an axis of symmetry (rotation axis) of the parabola, so that a plane containing the rotation axis becomes a cut surface. In FIG. 3(a) and FIG. 3(c), a curved line indicated by reference numeral 5a represents the parabolically curved surface. When the parabolic mirror 5 is viewed from the front, an opening 5b (exit for illumination light) of the parabolic mirror 5 is semicircular in shape (see FIG. 3(b)).

The laser element 2 is provided outside the parabolic mirror 5, and the parabolic mirror 5 has a tapered light guide section 20 through which laser light is transmitted or passed (later described in detail).

The parabolic mirror 5 can be partially non-parabolic. The parabolic mirror 5 can be a parabolic mirror with an opening of a closed circular shape or contain a part of such a parabolic mirror. The parabolic mirror 5 is not limited to a specific one, and can therefore be an ellipsoidal mirror or a free-form curved surface mirror. In other words, the parabolic mirror 5 can be of any shape, provided that at least a part of a curved surface formed by rotating a graphic (ellipsoid, circle, or parabola) around a rotation axis is a part of a reflecting surface of the parabolic mirror 5.

(Metal Base 7)

The metal base 7 is a platelike support member which supports the light emitting section 4. The metal base 7 is made from metal (such as copper or iron), and therefore has high thermal conductivity and is capable of efficiently radiating heat caused by the light emitting section 4. Note that the member supporting the light emitting section 4 is not limited to a member made from metal, and can be any member that contains a non-metal material (such as glass or sapphire) with high thermal conductivity. Note, however, that it is preferable that a surface, of the metal base 7, which surface abuts the light emitting section 4 acts as a reflecting surface. The surface acting as a reflecting surface allows laser light, which has entered the light emitting section 4 through its top, (i) to be converted to fluorescence and subsequently (ii) to be reflected by the reflecting surface, so as to be directed to the parabolic mirror 5. Alternatively, the surface acting as a reflecting surface allows the laser light, which has entered the light emitting section 4 through its top, to be reflected by the reflecting surface so as to be directed again to the inside of the light emitting section 4 for conversion to fluorescence.

The metal base 7 is covered with the parabolic mirror 5. It follows that the metal base 7 has a surface which faces the curved reflecting surface (parabolically curved surface) of the parabolic mirror 5. It is preferable that a surface, of the metal base 7, on which the light emitting section 4 is provided, (i) is substantially parallel to the rotation axis of the rotary paraboloid of the parabolic mirror 5 and (ii) substantially contains the rotation axis.

(Fin 8)

The fin 8 acts as a cooling section (heat radiation mechanism) which cools down the metal base 7. The fin 8 is made up of a plurality of heatsinks. A heat radiation efficiency of the fin 8 is improved by increasing an area where the metal base 7 comes into contact with air. The cooling section which cools down the metal base 7 is not limited to a specific one, provided that it has a cooling (heat radiation) function, and can therefore be a heat pipe, a water-cooled system, or an air-cooled system.

(Optical Fiber 10)

The optical fiber 10 is a flexible light guide member which guides the laser light emitted from the laser element 2 toward the light emitting section 4 via the tapered light guide section 20. The optical fiber 10 has a receiving end part where laser light is received and an emitting end part where the laser light, which has entered the receiving end part, is emitted.

The optical fiber 10 has a double layer structure in which a central core is covered with a clad which has a refractive index lower than that of the central core. The central core contains, in major proportions, quartz glass (silicon oxide) which causes almost no absorption loss of entered laser light. The clad contains, in major proportions, a quartz glass or a synthetic resin material which has a refractive index lower than that of the central core. For example, the optical fiber 10, made of quartz, has a core diameter of 200 µm, a clad diameter of 240 µm, and a numerical aperture NA of 0.22. Note, however, that the structure of, the diameter of, and the material for the optical fiber 10 are not limited to these. As such, the optical fiber 10 can have, for example, a rectangular cross-section in a direction perpendicular to a long axis direction.

Note that the light guide member is not limited to the optical fiber. For example, any member other than optical fiber or any flexible member made up of an optical fiber and another member. The light guide member only needs to have a receiving end part where laser light emitted from the laser element 2 is received and an emitting end part where the laser light, which has entered the receiving end part, is emitted. For example, (i) a receiving section with a receiving end part and (i) an emitting section with an emitting end part can be provided separately from the optical fiber so as to be connected to respective end parts of the optical fiber.

(Tapered Light Guide Section 20)

The tapered light guide section 20 directs the laser light emitted from the laser element 2 toward the light emitting section 4 via the optical fiber 10. The tapered light guide section 20 has a receiving end part (on a laser element 2 side) where the laser light emitted from an emitting end part of the optical fiber 10 is received and an emitting end part (on a light emitting section 4 side) where the laser light, which has entered the receiving end part, is emitted.

The tapered light guide section 20 has an surrounding structure in which an inner surface is surrounded by a light reflecting surface(s) which reflects the laser light which has entered the receiving end part. The tapered light guide section 20 has a smaller cross-sectional area in the emitting end part (on the light emitting section 4 side) than at the receiving end part.

Specifically, the tapered light guide section 20, as a whole, has a tubular shape like a quadrangular pyramidal trapezoid. Specifically, the light guide section 20 has a rectangular cross-section (opening) of, for example, 1 mm×3 mm in the emitting end part and a rectangular cross-section (opening) of 15 mm×15 mm in the receiving end part. Note, however, that the shape of the tapered light guide section 20 is not limited to a quadrangular pyramidal trapezoid. Alternatively, the light guide section can have any of various shapes, instead of the quadrangular pyramidal trapezoid. Examples of the shape include polygonal pyramidal trapezoids, conical trapezoids, and elliptical conical trapezoids. Furthermore, a distance between the receiving end part and the emitting end part can be set arbitrarily.

With the surrounding structure, the tapered light guide section 20 can (i) converge the laser light, which has entered the receiving end part, onto the emitting end part which has the smaller cross-sectional area than that of the receiving end part and then (ii) emit the laser light thus converged. In a case where a plurality of laser elements 2 are employed to achieve high power, in the tapered light guide section 20, the light emitting section 4 can be designed so as to be downsized. In other words, the tapered light guide section 20 enables the head lamp 1 to achieve high power and high luminance.

The tapered light guide section 20 can be composed of a transparent material, such as BK (boro-silicate crown) 7, quartz glass, or an acrylic resin. Alternatively, the light guide section 20 (i.e., its external surface) can also be coated with a high reflectance material such as aluminum or silver.

The description has exemplified, as a second light guide member, the tapered light guide section 20 with a light-converging function. The second light guide member is not limited to the tapered light guide section 20, and can therefore be of any shape, provided it can guide light from its receiving end part to its emitting end part. Examples of such a second light guide member include a light guide section of rod type, which has a light-guiding function and has identical (substantially identical) cross-sectional areas in the respective receiving and emitting end parts.

According to the tapered light guide section 20, its laser light guide path is located so as to be fixed relative to the parabolic mirror 5. The optical fiber 10 and the tapered light guide section 20 are each provided so as to have a receiving end part where emission light is received and an emitting end part where emission light is emitted. The emitting end part of the optical fiber 10 is either located near the receiving end part of the tapered light guide section 20 or fixed to the receiving end part of the tapered light guide section 20. Details will be later described in reference to FIG. 5, etc.

[Application Example of Head Lamp 1]

An example application of the head lamp 1 is described now.

Figure 4:
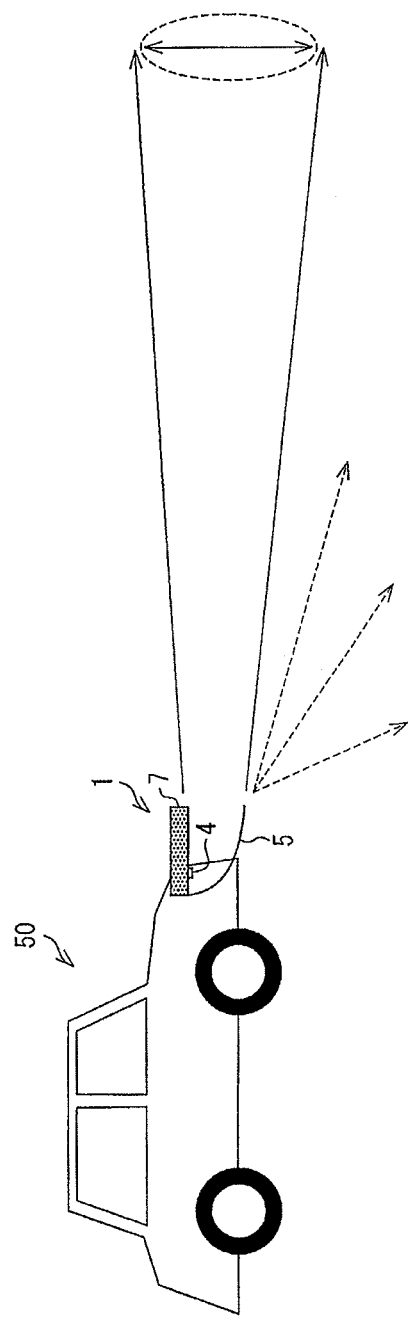
FIG. 4 is a conceptual diagram illustrating a direction in which a head lamp 1 is arranged in a case where the head lamp is mounted to an automobile.

FIG. 4 is a conceptual diagram illustrating a direction in which the head lamp 1 is arranged in a case where the head lamp 1 is applied to a headlight of an automobile (vehicle) 50. As illustrated in FIG. 4, the head lamp 1 can be provided in a head part of the automobile 50 so that the parabolic mirror 5 is located vertically downward. With the arrangement, due to the foregoing projecting characteristic of the parabola mirror 5, not only the forward of the automobile 50 is brightly illuminated but also lower forward of the automobile 50 is also illuminated to a moderate extent.

The head lamp 1 can be applied to a driving headlight (high beam) or a dipped-beam headlight (low beam) for an automobile. Examples of an illumination device of the present embodiment include a downlight. The downlight refers to an illumination device provided on a ceiling of a structure, such as a house or a vehicle. Furthermore, the illumination device in accordance with the present embodiment can be implemented (i) as a head lamp of a movable object (such as a human, a ship, an aircraft, a submarine, or a rocket) other than a vehicle or (ii) as a room light fixture (such as a desk lamp) other than a search light, a projector and a downlight

[Holding Example 1 for Tapered Light Guide Section]

Figure 5:
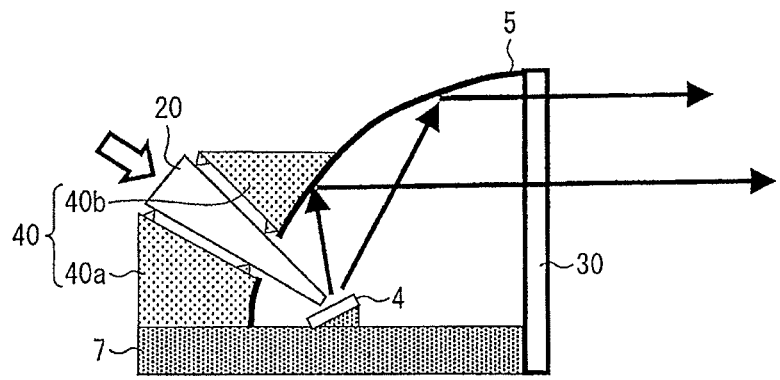
FIG. 5 is a side view of an example in which a tapered light guide section is held.

The following will describe an example in which the parabolic mirror 5 holds the taper-type light guide section 20 in reference to FIG. 5. FIG. 5 is a side view of an example in which a tapered light guide section is held. As illustrated in FIG. 5, attached to the parabolic mirror 5 are holding members 40*a* and 40*b* (hereinafter simply referred to as "holding members 40" in a case where no distinction needs to be made between these holding members 40*a* and 40*b*). The holding member 40*a* is fixed to a parabolic mirror 5 and a metal base 7, whereas the holding member 40*b* is fixed to the parabolic mirror 5. The tapered light guide section 20 (more specifically, a part of the tapered light guide section 20 which part is projected from the parabolic mirror 5) is sandwiched between the holding members 40*a* and 40*b*.

More specifically, the tapered light guide section 20 is held, at points on its outer surface, by the holding members 40. This causes fixing of relative positions of a laser light guide path in the tapered light guide section 20 and the parabolic mirror 5.

An optical fiber 10 and the tapered light guide section 20 are each provided so as to have a receiving end part where emission light is received and an emitting end part where emission light is emitted (not illustrated). The emitting end part of the optical fiber 10 is either located near the receiving end part of the tapered light guide section 20 or fixed to the receiving end part of the tapered light guide section 20.

The arrangement greatly reduces the area in which the tapered light guide section 20 is held by the holding members 40. This allows the laser light to be guided toward a light emitting section 4 by means of total reflection. Total reflection occurs due to a difference in refractive index between (i) of a member (such as quartz glass) which constitutes the tapered light guide section 20 and (ii) a surrounding environment (air). The tapered light guide section 20 can hence restrain loss of light caused by reflection of light.

Figure 6:
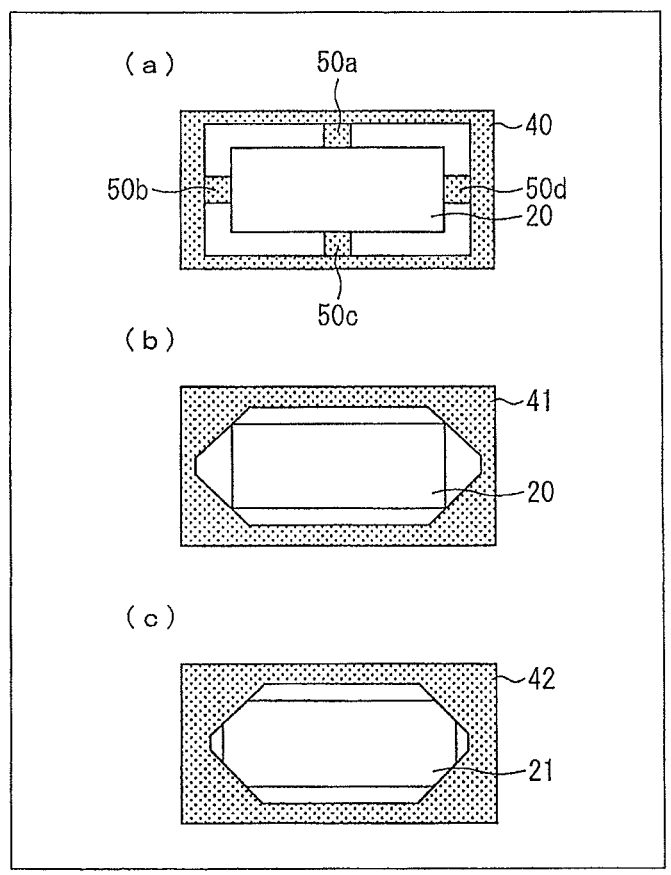
FIG. 6(a) through FIG. 6(c) are front views illustrating examples of how tapered light guide sections are held.

The following description will discuss how holding members hold the tapered light guide section 20 in reference to FIGS. 6(*a*) through 6(*c*). Note that FIGS. 6(*a*) through 6(*c*) are front views illustrating an example of how the tapered light guide section is held.

FIG. 6(*a*) illustrates the tapered light guide section 20, which has a quadrangular pyramidal trapezoid shape and is held by the holding members 40 at points 50*a*, 50*b*, 50*c*, and 50*d* on respective surfaces of the tapered light guide section 20.

FIG. 6(*b*) illustrates the tapered light guide section 20, which has a quadrangular pyramidal trapezoid shape and is held by a holding member 41 on four corners (edges) of the tapered light guide section 20.

FIG. 6(*c*) illustrates a tapered light guide section 21, which (i) has a quadrangular pyramidal trapezoid shape whose four corners have been subjected to chamfer and (ii) is held by a holding member 42 at a point on each bevel of the tapered light guide section 21. This arrangement allows larger holding areas to be secured. As such, the tapered light guide section 21 can be held in a more stable manner, as compared with an arrangement in which no bevel is provided.

The tapered light guide section is held by a holding member in various ways as exemplified by these examples. Any one of the examples greatly reduces the area in which the tapered light guide section is held by the holding member and can thus restrain loss of light caused by reflection of light, which reflection is caused by the holding member.

According to the arrangement illustrated in FIG. 5, a filter 30 is provided in an opening of the parabolic mirror 5. The filter 30 has a function of absorbing, for example, ultraviolet light having a wavelength of around 405 nm. The function prevents the ultraviolet light from leaking out of the head lamp. This brings about an effect of being able to improve safety of the head lamp.

In FIGS. 5 and 6, the tapered light guide section 20 is assumed to have a quadrangular pyramidal trapezoid shape. The shape of the tapered light guide section 20 is, however, not limited to the quadrangular pyramidal trapezoid shape. Alternatively, the tapered light guide section 20 can have any of various shapes. In other words, any method of holding a tapered light guide section is encompassed in the present embodiment, provided that the method has the same purpose as the technical concept described in reference to FIGS. 5 and 6. The same is true for holding examples 2 and 3 for the tapered light guide section (later described in detail).

Any content that is similar to the content described in relation to holding example 1 for the tapered light guide section will not be repeated for holding examples 2 and 3 in the following description.

[Holding Example 2 for Tapered Light Guide Section]

Figure 7:
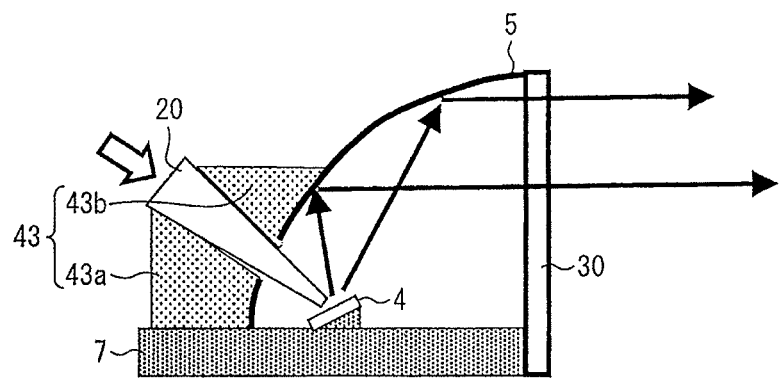
FIG. 7 is a side view of another example in which a tapered light guide section is held.

The following will describe another method of holding a tapered light guide section 20 with a holding member 43 in reference to FIG. 7, etc. FIG. 7 is a side view of another example in which the tapered light guide section 20 is held.

As illustrated in FIG. 7, attached to a parabolic mirror 5 are holding members 43*a* and 43*b* (hereinafter simply referred to as "holding members 43" in a case where no distinction needs to be made between these holding members 43*a* and 43*b*). The holding member 43*a* is fixed to a parabolic mirror 5 and a metal base 7, whereas the holding member 43*b* is fixed to the parabolic mirror 5. The tapered light guide section 20 (a part of the tapered light guide section 20 which part is projected from the parabolic mirror 5) is sandwiched between the holding members 43*a* and 43*b*. More specifically, the tapered light guide section 20 has a quadrangular pyramidal trapezoid shape and is sandwiched on its entire four surfaces between the holding members 43. This arrangement causes firm fixing of relative positions of a laser light guide path in the tapered light guide section 20 and the parabolic mirror 5.

With the arrangement, the tapered light guide section 20 (i.e., its four surfaces) are coated with a high reflectance material (such as aluminum or silver). This allows laser light to be guided toward the light emitting section 4 by means of efficient reflection.

Figure 8:
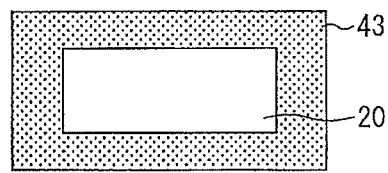
FIG. 8 is a front view of the example illustrated in FIG. 7.

FIG. 8 is a front view of the example illustrated in FIG. 7. As illustrated in FIG. 8, the tapered light guide section 20, having a quadrangular pyramidal trapezoid shape, which is held on its entire surfaces by the holding members 43. This arrangement causes more firm fixing of relative positions of a laser light guide path in the tapered light guide section 20 and a parabolic mirror 5.

[Holding Example 3 for Light Guide Section of Rod Type]

Figure 9:
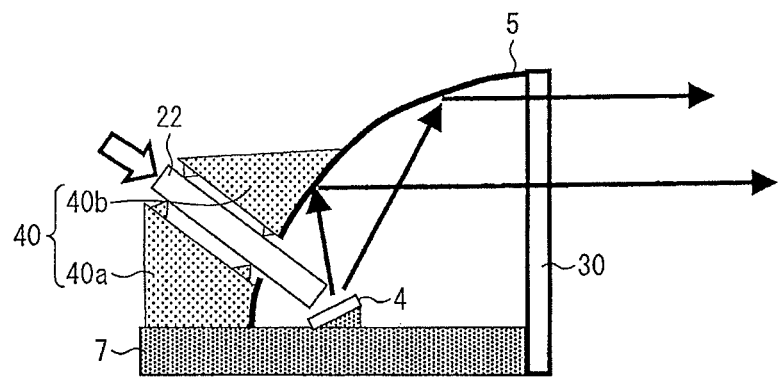
FIG. 9 is a side view of a holding example in which a light guide section of rod type is held.
Figure 10:
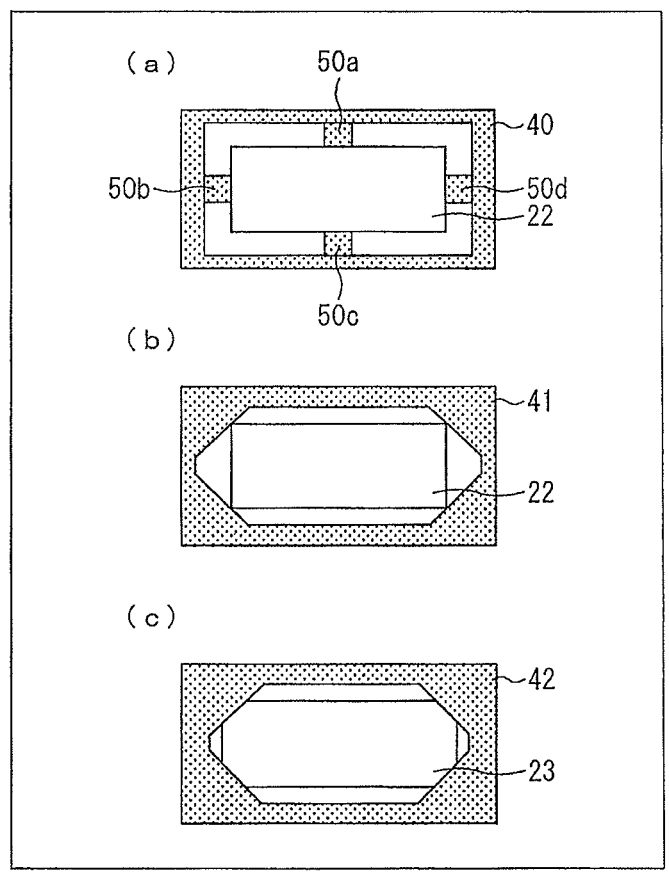
FIG. 10(a) through FIG. 10(c) are front views illustrating examples of how light guide sections of rod type are held.
Figure 11:
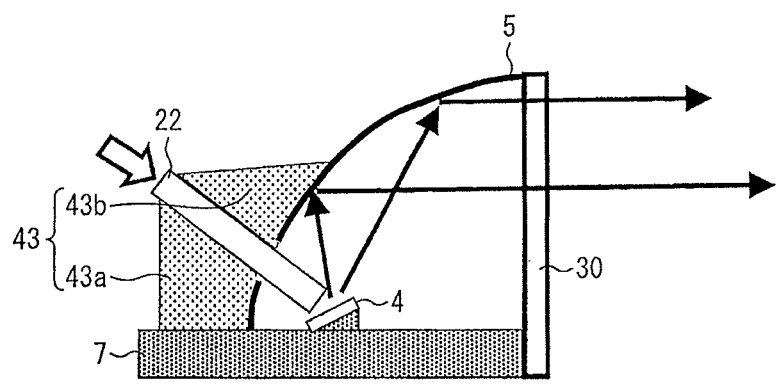
FIG. 11 is a side view of another example in which a light guide section of rod type is held.

The following will describe a case where a light guide section of rod type is employed as the light guide section. FIG. 9 is a side view of a holding example in which a light guide section of rod type 22 is held. FIGS. 10(*a*) through 10(*c*) are front views illustrating examples of how the light guide section of rod type 22 and a light guide section of rod type 23 are held respectively. FIG. 11 is a side view of another example in which the light guide section of rod type 22 is held.

Of these drawings, FIG. 10(*a*) illustrates the light guide section of rod type 22, which has a rectangular parallelepiped shape and is held by holding members 40 at points 50*a*, 50*b*, 50*c*, and 50*d* on respective surfaces of the light guide section of rod type 22.

FIG. 10(*b*) illustrates the light guide section of rod type 22 being held by a holding member 41 on four corners (edges) of the light guide section of rod type 22.

FIG. 10(*c*) illustrates the light guide section of rod type 23, which has a rectangular parallelepiped shape and is held by a holding member 42 at a point on each bevel of the light guide section of rod type 23, the bevels being made by cutting off four corners of the light guide section of rod type 23. This arrangement allows larger holding areas to be secured. As such, the light guide section of rod type 23 can be held in a more stable manner, as compared with an arrangement in which no bevel is provided.

Figure 12:
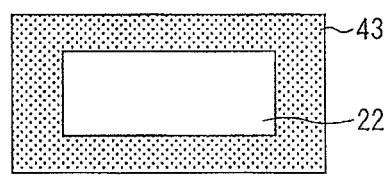
FIG. 12 is a front view of another example in which a light guide section of rod type is held.

FIG. 12 is a front view of another example in which the light guide section of rod type 22 is held.

The light guide section of rod type 22 has, as a whole, a tubular shape like a rectangular parallelepiped. In other words, the light guide section of rod type 22 has identical (substantially identical) cross-sectional areas in an to emitting end part (on the light emitting section 4 side) section and at a receiving end part for laser light.

As is clear from FIGS. 10(*a*) through 12, even in a case of employing the light guide section of rod type 22, it is possible to obtain similar effects, by use of arrangements identical to the arrangements which have been described with reference to FIGS. 5 through 8.

[Effects of Head Lamp 1]

According to each of the arrangements discussed above, the head lamp 1 in accordance with the present embodiment brings about the following effects.

The head lamp 1 enables the relative positions of the laser light guide path in the tapered light guide section 20 and the parabolic mirror 5 to be fixed. Even in a case where the head lamp 1 is subjected to vibration, a predetermined position on the light emitting section 4 is irradiated with laser light in a stable manner. In other words, the head lamp 1 can restrain adverse effects of vibration.

Furthermore, according to the head lamp 1, the emitting end part of the optical fiber 10 is located near the receiving end part of the tapered light guide section 20. Therefore even in a case where the optical fiber 10 and the tapered light guide section 20 are displaced, the laser light emitted from the optical fiber 10 can be directed toward the tapered light guide section 20 in a stable manner. This allows the head lamp 1 to sustain stable distribution of light.

In addition, the optical fiber 10 is employed in the head lamp 1. The optical fiber 10 is flexible and adjustable in length. According to the head lamp 1, the laser element 2 and the light emitting section 4 can be thus arranged with a fixed distance between them. The distance secures heat radiation of the laser element 2 and the light emitting section 4. In other words, the laser element 2 and the light emitting section 4 can be thermally isolated from each other. This allows an improvement in heat radiation of the head lamp 1.

Furthermore, the optical fiber 10, which is flexible and adjustable in length, is employed in the head lamp 1. The location (layout) of the laser element 2 can therefore be determined in a flexible manner. In other words, since the head lamp 1 has high design freedom, it is possible to increase a degree of freedom in designing an automobile headlight into which the head lamp 1 is incorporated.

Furthermore, the head lamp 1 is arranged to converge, by means of the tapered light guide section 20, the laser light having been guided by the optical fiber 10 and then irradiate the light emitting section 4 with the light thus converged. The tapered light guide section 20 can guide laser light to the light emitting section 4 by means of total reflection. Total reflection occurs due to a difference in refractive index between (i) of a member (such as quartz glass) which constitutes the tapered light guide section 20 and (ii) a surrounding environment (air). Alternatively, the tapered light guide section 20, if coated on its external surface with a high reflectance material (such as aluminum or a like metal material), can guide laser light to the light emitting section 4 by means of efficient reflection. This allows the head lamp 1 to reduce loss of light by using the tapered light guide section 20.

[Modification 1]

Figure 13:
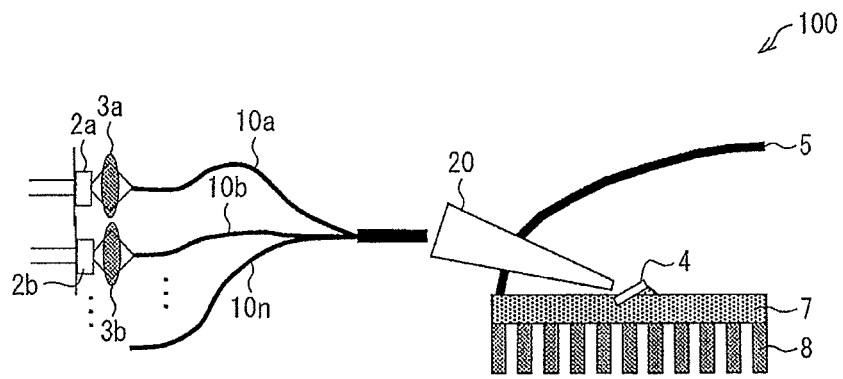
FIG. 13 is a cross-sectional view of a schematic arrangement of another head lamp in accordance with an embodiment of the present invention.

The following description will discuss a head lamp 100, which is a modification of the present embodiment, in reference to FIG. 13. FIG. 13 is a cross-sectional view of a schematic arrangement of the head lamp 100. The descriptions given in reference to FIG. 1 and other drawings will not be repeated.

As illustrated in FIG. 13, the head lamp 100 includes sets of laser elements 2 and condenser lenses 3, optical fibers 10 for the respective sets, a light emitting section 4, a parabolic mirror 5, a metal base 7, a fin 8, and a tapered light guide section 20.

More specifically, laser light, which is emitted from a laser element 2*a*, enters via a condenser lens 3*a* a receiving end part of an optical fiber 10*a*, in which receiving end part laser light is received. The laser light, which has entered the receiving end part, is directed toward the tapered light guide section 20, via an emitting end part of the optical fiber 10*a*. Similarly, with a laser to element 2*b*, a condenser lens 3*b*, and an optical fiber 10*b* being arranged as one set, laser light emitted from the laser element 2*b* enters the tapered light guide section 20. A laser element 2*n*, a condenser lens 3*n*, and an optical fiber 10*n* thus constitute a corresponding set. Laser light emitted from the laser element 2*n* enters the tapered light guide section 20. Under the circumstances, the emitting end parts of the respective optical fibers 10 form a bundle.

[Effects of Modification 1]

Assume that there is provided no tapered light guide section 20 in the arrangement, in order to appreciate effects of Modification 1. Under the assumption, since it will be difficult to fix the optical fibers 10, it is highly likely that the position, on the light emitting section 4 which position is irradiated with laser light, deviates from an intended position. It is therefore expected that it will be difficult to irradiate a narrow region on the light emitting section 4 with laser light emitted from each of the optical fibers 10 in the bundle. In addition, in the absence of the tapered light guide section 20, it will be more difficult to irradiate a narrow region on the light emitting section 4 with laser light in a case where the head lamp is subjected to, for example, vibration.

In contrast, the head lamp 100 includes the tapered light guide section 20 and guides the laser light emitted from each of the bundled emitting end parts of the optical fibers 10 toward the tapered light guide section 20. Since the tapered light guide section 20 is attached to the parabolic mirror 5, the tapered light guide section 20 enables the relative positions of a laser light guide path in the tapered light guide section 20 and the parabolic mirror 5 to be fixed.

The head lamp 100 can therefore address problems caused in a case of the absence of the tapered light guide section 20.

Assume now that the emitting end parts of the respective optical fibers 10 do not form a bundle, in order to appreciate effects of Modification 1. Under the assumption, it will be necessary to broaden a receiving end part of the tapered light guide section 20 in order that all the emitting end parts of the respective optical fibers 10 are arranged near the tapered light guide section 20 in a stable manner. This will cause an increase in the overall size of the tapered light guide section 20.

This problem can be addressed by arranging the emitting end parts of the respective optical fibers 10 so as to form a bundle. As a result, it is possible to provide a head lamp 100 in which (i) a tapered light guide section 20 is downsized and (ii) stable distribution of light can be sustained.

[Modification 2]

Figure 14:
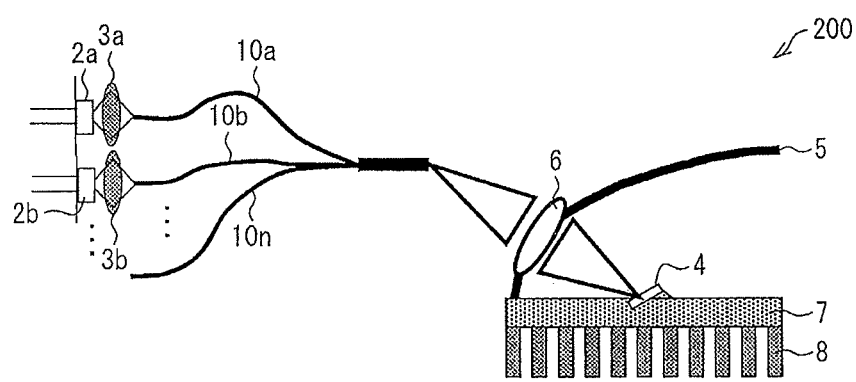
FIG. 14 is a cross-sectional view of a schematic arrangement of yet another head lamp in accordance with an embodiment of the present invention.

The following description will discuss a head lamp 200, which is a modification of the present embodiment, in reference to FIG. 14. FIG. 14 is a cross-sectional view of a schematic arrangement of the head lamp 200. The descriptions given in reference to FIG. 1 and other drawings will not be repeated.

As illustrated in FIG. 14, the head lamp 200 includes sets of laser elements 2 and condenser lenses 3, optical fibers 10 for the respective sets, a light emitting section 4, a parabolic mirror 5, a metal base 7, a fin 8, and a convex lens (second light guide section) 6.

Note that laser light emitting end parts of the optical fibers 10 form a bundle. Also note that the part thus bundled is fixed by a fixing member (not illustrated) in the head lamp 200.

The convex lens 6 is fixed to the parabolic mirror 5. For example, the parabolic mirror 5 has an opening into which the convex lens 6 is fitted.

[Effects of Modification 2]

With the arrangement, the head lamp 200 can converge laser light guided by the optical fibers 10 by using the convex lens 6 and then irradiate the light emitting section 4 with the light thus converged. The arrangement only needs the convex lens 6 to converge laser light onto the light emitting section 4. This causes a reduction in the number of components and causes the convex lens 6 to be downsized. As such, it is possible to downsize the head lamp 200. According to the arrangement, since the optical fibers 10 is used to converge laser light onto the convex lens 6, the laser elements 2 and the light emitting section 4 can be separated from each other. The laser elements 2 and the light emitting section 4 can be thus thermally isolated from each other. This allows an improvement in heat radiation of the head lamp 1.

[Modification 3]

Figure 15:
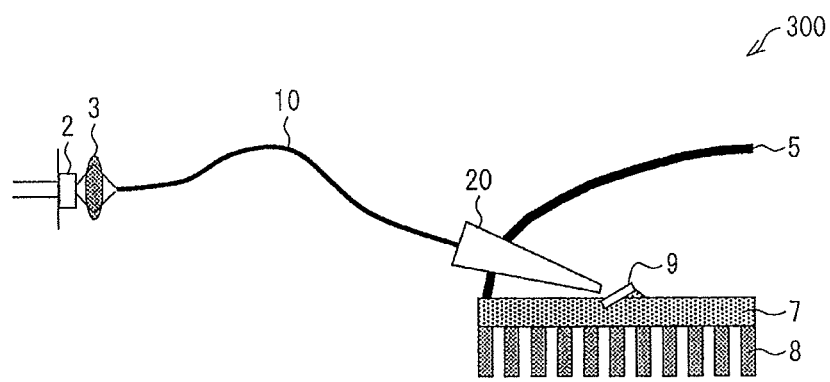
FIG. 15 is a cross-sectional view of a schematic arrangement of still another head lamp in accordance with an embodiment of the present invention.
Figure 16:
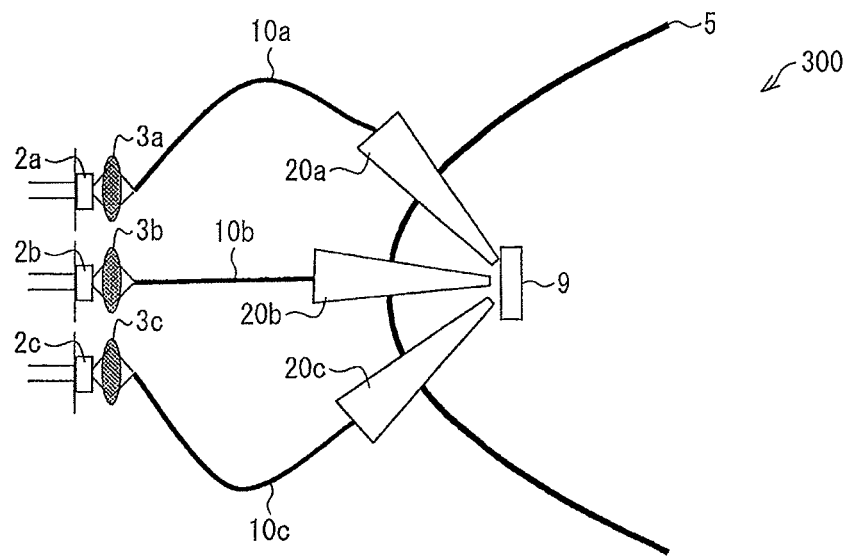
FIG. 16 is a top view of a schematic arrangement of yet still another head lamp in accordance with an embodiment of the present invention.

The following description will discuss a head lamp 300, which is a modification of the present embodiment, in reference to FIGS. 15 and 16. FIG. 15 is a cross-sectional view of a schematic arrangement of the head lamp 300. The descriptions given in reference to FIG. 1 and other drawings will not be repeated.

As illustrated in FIG. 15, the head lamp 300 includes laser elements 2, condenser lenses 3, a scatterer 9, a parabolic mirror 5, a metal base 7, a fin 8, optical fibers 10, and tapered light guide sections 20.

According to the head lamp 300, the light emitting section 4 provided in the head lamp 1 and containing a fluorescent material is replaced by the scatterer 9 located near a focal point of the parabolic mirror 5. The scatterer 9 diffusely reflects laser light to scatter the laser light. The scatterer 9, which is irradiated with laser light, scatters the laser light.

This will be described more specifically in reference to FIG. 16. FIG. 16 is a top view of a schematic arrangement of the head lamp 300.

As illustrated in FIG. 16, the head lamp 300 includes a laser element 2a which emits red laser light, a laser element 2b which emits green laser light, and a laser element 2c which emits blue laser light. The head lamp 300 further includes condenser lenses 3a through 3c, optical fibers 10a through 10c, and tapered light guide sections 20a through 20c for the respective laser element 2a to 2c. With the arrangement, the head lamp 300 irradiates the scatterer 9 with red laser light, green laser light, and blue laser light emitted from the tapered light guide sections 20a to 20c, and the scatterer 9 scatters the laser light of each color. This causes the red, green, and blue light to be mixed so that the head lamp 300 can emit, to the outside, white light as illumination light.

In the above description, the laser light emitted from each laser element is directed toward the scatterer 9 via a corresponding different tapered light guide section. The head lamp 300 is, however, not limited to this. Alternatively, the scatterer 9 can be irradiated with laser light of different colors via a single tapered light guide section.

The arrangement causes outside the head lamp 300 to be irradiated with white light as illumination light. Alternatively, in a case where pseudo-white light is utilized as illumination light, yellow and blue laser elements can be employed.

[Effects of Modification 3]

As mentioned above, the head lamp 300 employs the scatterer 9 which diffusely reflects laser light to scatter the laser light, in place of the light emitting section 4 containing a fluorescent material. In other words, the head lamp in accordance with Modification 3 is also suitably applicable to the scatterer 9 even in a case where the light emitting section 4 containing a fluorescent material is not employed.

[Reflection-Type and Transmission-Type Head Lamps]

The head lamps described so far include a light emitting section which is irradiated with laser light from a direction where the parabolic mirror 5 is provided (this type of light emitting section is referred to as the "reflection-type light emitting section" in this application). A head lamp including a reflection-type light emitting section is, in the present embodiment, referred to as a reflection-type head lamp.

In a reflection-type head lamp, the light emitting section 4 is irradiated with laser light from a direction where the parabolic mirror 5 is provided. This allows the light emitting section 4 to emit fluorescence from a surface (irradiation surface) that is hit by the laser light. The fluorescence is reflected by the parabolic mirror 5 and illuminated outside by the head lamp.

However, in the present embodiment, the light emitting section 4 has an irradiation surface that differs from a case of a reflection-type head lamp. The present embodiment is also applicable to a head lamp in which the light emitting section 4 is irradiated with laser light from a direction where the fin 8 is provided in the case of FIG. 1 (this type of light emitting section is referred to as the "transmission-type light emitting section" in this application). A head lamp including a transmission-type light emitting section is, in the present embodiment, referred to as a transmission-type head lamp.

In a transmission-type head lamp, the light emitting section 4 is irradiated with laser light from a direction where the fin 8 is provided in the case of FIG. 1. This allows the light emitting section 4 to emit fluorescence from a surface (surface facing the parabolic mirror 5) that is opposite to the irradiation surface. The fluorescence emitted from the light emitting section 4 is reflected by the parabolic mirror 5 so as to be illuminated outside by the head lamp.

In the transmission-type head lamp, positions of a laser element 2, an optical fiber 10, a tapered light guide section 20, etc. are not limited to any particular positions and can be determined in an appropriate manner. The various arrangements described in Modification 1 through 3 are also applicable to the transmission-type head lamp.

[Example 1]

Figure 17:
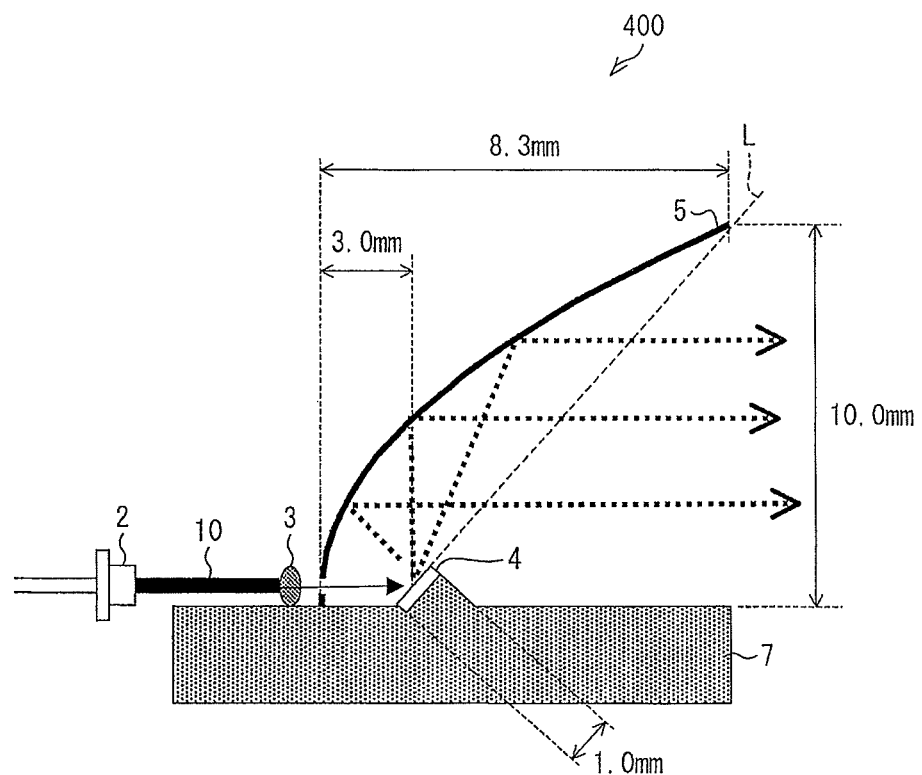
FIG. 17 is a cross-sectional view of an example of a head lamp in accordance with an embodiment of the present invention.

The following description will discuss a head lamp 400, which is an example of the present embodiment, in reference to FIG. 17. The descriptions given in reference to FIG. 1 and other drawings will not be repeated.

FIG. 17 is a side view of the head lamp 400 in accordance with the present embodiment. According to the head lamp 400, the laser element 2 is mounted in a metal package with a 9-mm diameter and outputs 2-watt laser light at a wavelength of 405 nm. The laser light is converged by a condenser lens 3 to an area with a 0.3-mm diameter which lies on the light emitting section 4.

The parabolic mirror 5 has a semicircular front opening with a radius of 10 mm and has a depth of 8.3 mm. The parabolic mirror 5 is made of resin and has an internal surface thereof coated with aluminum.

The light emitting section 4 contains a fluorescent material which is prepared by mixing three RGB fluorescent materials so that the light emitting section 4 can emit white light. Specifically, the R (red) fluorescent material is $CaAlSiN_3$:Eu, the G (green) fluorescent material is $\beta$-SiAlON:Eu, and the B (blue) fluorescent material is (BaSr) $MgAl_{10}O_{17}$:Eu. The light emitting section 4 is shaped like a thin film with dimensions of 1 mm×1 mm×0.1 mm (thickness). The fluorescent material, in powder form, is mixed with resin before being applied. The light emitting section 4 is provided so that the parabolic mirror 5 has its focal point located at a center of the light emitting section 4. The center of the light emitting section 4 is excited by laser light.

The parabolic mirror 5 is coupled at its lower part to a metal (aluminum) base 7 which carries on it the light emitting section 4. The metal base 7 also serves to dissipate heat generated by the laser light and the light emitting section 4.

With the arrangement, the head lamp 400 can efficiently project light to an area with a 1-m diameter which lies 25 m ahead. In addition, use of five head lamps 400 realizes projection of light by means of desired distribution of light.

The following improvement is also made to the head lamp 400. The light emitting section 4 is provided at a particular angle to a surface of the metal base 7 so that an extension (a line indicated by L in FIG. 17) of the irradiation surface intersects an outermost edge of the opening of the parabolic mirror 5. This arrangement prevents a light emitting point in the light emitting section 4 to be viewed directly from the outside of the metal base 7. The arrangement thus reduces glare or dazzle which can occur when the light emitting section 4 is viewed from outside. The arrangement also enables the fluorescence emitted from the light emitting section 4 to be reflected efficiently and effectively by the parabolic mirror 5.

[Example 2]

Figure 18:
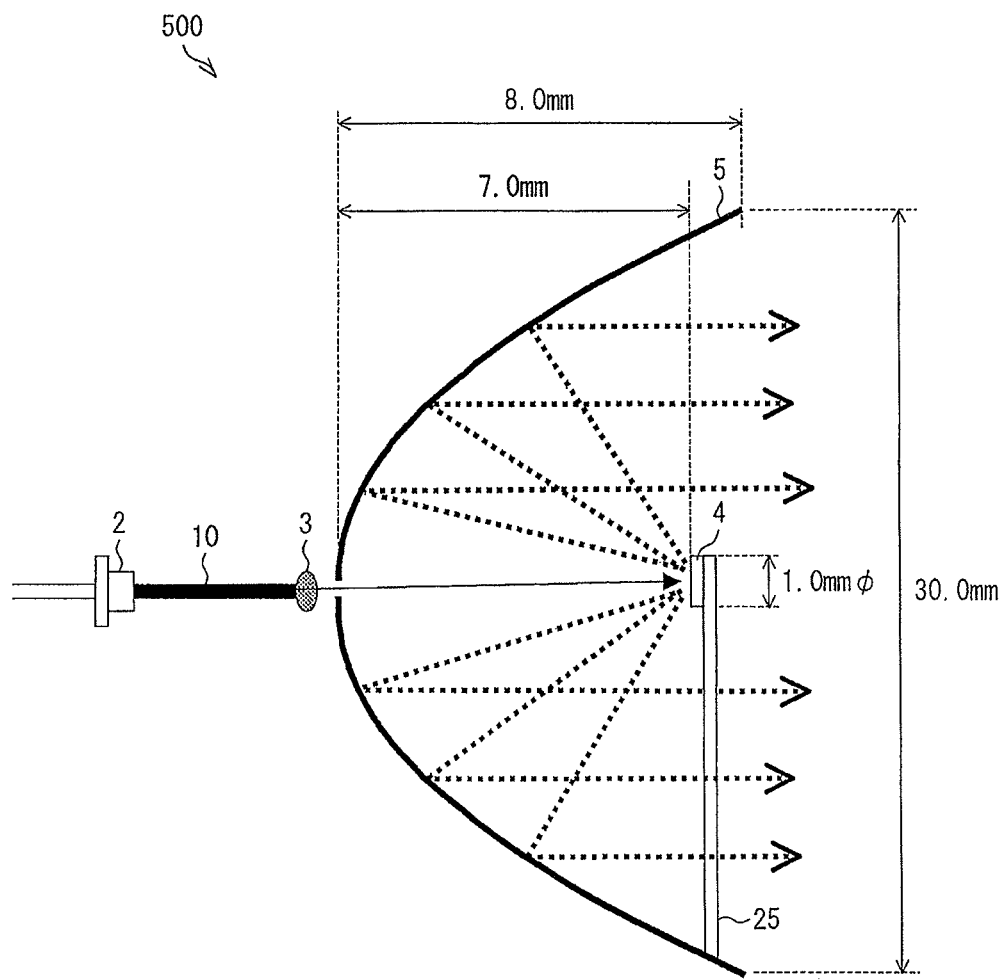
FIG. 18 is a cross-sectional view of another example of a head lamp in accordance with an embodiment of the present invention.

The following description will discuss a head lamp 500, which is another example of the present embodiment, in reference to FIG. 18. The descriptions given in reference to FIG. 1 and other drawings will not be repeated.

FIG. 18 is a schematic top view of the head lamp 500. According to the head lamp 500, a laser element 2 is mounted in a metal package with a 9-mm diameter and outputs 2-watt laser light at a wavelength of 405 nm. The laser light is converged by a condenser lens 3 to an area with a 0.6-mm diameter which lies on a light emitting section 4.

A parabolic mirror 5 has a circular front opening with a diameter of 30 mm and has a depth of 8.0 mm. The parabolic mirror 5 is made of resin and has an internal surface thereof coated with aluminum.

The light emitting section 4 contains a fluorescent material which is prepared by mixing three RGB fluorescent materials so that the light emitting section 4 can emit white light. Specifically, the R (red) fluorescent material is $CaAlSiN_3$:Eu, the G (green) fluorescent material is $\beta$-SiAlON:Eu, and the B (blue) fluorescent material is (BaSr) $MgAl_{10}O_{17}$:Eu. The light emitting section 4 is shaped like a thin film with a 1-mm diameter and a 0.1-mm thickness. The fluorescent material, in powder form, is mixed with resin before being applied. The light emitting section 4 is provided so that the parabolic mirror 5 has its focal point located at a center of the light emitting section 4. The center of the light emitting section 4 is excited by laser light. The light emitting section 4 in the head lamp 500 is attached on its back surface (surface opposite to the laser element 2, located on the right side of FIG. 18) to a metal post 25.

The metal post 25 is supported by the parabolic mirror 5 and also serves to dissipate heat generated by the light emitting section 4. The metal post 25, together with the light emitting section 4, can be arranged to be replaceable so as to restrain adverse effects of thermal degradation of the light emitting section 4 to use the head lamp 500 over an extended period of time.

With the arrangement, the head lamp 500 can efficiently project light to an area with a 1-m diameter which lies 25 m ahead, by exciting an area with a 0.6-mm diameter on the light emitting section 4 with laser light for emission of light.

[Alternative Definition of Present Invention]

The following is an alternative definition of the present invention.

In an illumination device in accordance with the present invention, the first light guide section may be an optical fiber.

The optical fiber is flexible and readily adjustable in length. Therefore, the arrangement allows the position of the light source to be freely altered in guiding the emission light emitted from the light source to the second light guide section. In other words, the arrangement gives improved freedom to location (layout) of the light source.

An illumination device in accordance with the present invention may be arranged so that: the light source is made up of a plurality of light sources; the first light guide section includes a plurality of optical fibers each receiving emission light from a corresponding one of the plurality of light sources; and the plurality of optical fibers have respective emitting end parts which form a bundle.

Assume that a plurality of light sources are employed and that the emitting end parts for emission light of the plurality of optical fibers do not form a bundle. Under the assumption, it will be necessary to broaden a receiving end part of the second light guide section in order that all the emitting end parts of the plurality of optical fibers are arranged near the second light guide section in a stable manner. This will cause an increase in the overall size of the second light guide section.

This problem can be addressed by arranging the emitting end parts for emission light of the plurality of optical fibers so as to form a bundle. As a result, it is possible to provide a head lamp 100 in which (i) a second light guide section is downsized and (ii) stable distribution of light can be sustained.

In an illumination device in accordance with the present invention, the emitting end part of the second light guide section may have a cross-sectional area which is smaller than or equal to that of the receiving end part.

According to the arrangement, the emission light which has entered the second light guide section through its receiving end part is guided toward its emitting end part which has a smaller cross-sectional area than the receiving end part. In other words, the emission light is converged to the emitting end part. This causes a compact light conversion section, capable of high luminance and high light flux, to be made according to the number of light sources.

In an illumination device in accordance with the present invention, the second light guide section may have a reflective material coating on its external surface which corresponds to a part forming the light guide path.

According to the arrangement, the emission light guided by the second light guide section can be reflected by the external surface coated with a reflective material. The arrangement can therefore restrain loss of emission light in the second light guide section.

In an illumination device in accordance with the present invention, the second light guide section may guide the emission light by means of total reflection, occurred due to a difference in refractive index between (i) a material which constitutes the second light guide section and (ii) surrounding environment.

According to the arrangement, the second light guide section guides the emission light by means of total reflection. Total reflection occurs due to a difference in refractive index between (i) a material which constitutes the second light guide section and (ii) surrounding environment. The arrangement can hence restrain loss of emission light in the second light guide section.

In an illumination device in accordance with the present invention, the second light guide section may be a convex lens which converges the emission light guided from the first light guide section onto the light conversion section.

According to the arrangement, the emission light guided from the first light guide section can be directed toward the light conversion section by using the convex lens (second light guide section). The arrangement thus involves a small number of components and allows for a compact second light guide section.

In addition, the illumination device in accordance with the present invention employs a flexible first light guide section. Therefore, the light source and the light conversion section can be separated from each other, when compared with a case where the light conversion section is irradiated with the emission light solely by the to convex lens. The distance enables dispersion of heat generated by the light source and the light conversion section.

In an illumination device in accordance with the present invention, the emitting end part of the first light guide section and the receiving end part of the second light guide section may be fixed integrally.

According to the arrangement, even in a case where the first light guide section and the second light guide section are displaced, the emission light emitted from the first light guide section can be directed toward the second light guide section in a stable manner. The present illumination device can thus sustain more stable distribution of light.

An illumination device in accordance with the present invention may be arranged so that: the light source emits excitation light as the emission light; and the light conversion section contains a fluorescent material which emits fluorescence upon receipt of the excitation light.

According to the arrangement, the emission light emitted from the light source is converted to fluorescence by the fluorescent material contained in the light conversion section. The fluorescence is distributed in particular directions under the control of the light distribution section.

In other words, the illumination device in accordance with the present invention is suitably applicable to an arrangement in which the light conversion section contains a fluorescent material which emits fluorescence upon receipt of the excitation light.

In an illumination device in accordance with the present invention, the light conversion section may contain a scatterer which scatters emission light guided by the second light guide section.

According to the arrangement, the emission light emitted from the light source is scattered by the scatterer contained in the light conversion section. The scattered emission light is distributed in particular directions under the control of the light distribution section.

In other words, the illumination device in accordance with the present invention is suitably applicable to an arrangement in which the light conversion section contains a scatterer which scatters the emission light guided by the second light guide section.

A vehicle headlight in accordance with the present invention may be arranged to include any one of the illumination devices discussed above.

An illumination device in accordance with the present invention is suitably applicable to a vehicle headlight. This causes a vehicle headlight to be realized which is capable of sustaining stable distribution of light even in a case where the vehicle vibrates while moving or brings about other undesirable conditions, for example, in to a case where an illumination device in accordance with the present invention is applied to a vehicle headlight. The conventional problems can be readily addressed.

[Alternative Definition of Present Invention]

A head lamp in accordance with the present invention may be arranged as follows.

A head lamp in accordance with the present invention may include: a light source emitting emission light; an emission light conversion section converting the emission light emitted from the light source to illumination light; a first light guide member and a second light guide member, which guide the emission light; and a light projection member for projecting light the illumination light ahead, wherein: the first light guide member guides the emission light to a receiving end part of the second light guide member; and the second light guide member converges the emission light to the emission light conversion section and is fixed to the light projection member.

In a head lamp in accordance with the present invention, the first light guide member may be an optical fiber.

In a head lamp in accordance with the present invention, the second light guide member may include a light receiving surface where the emission light is received and a light emitting surface which has a smaller area than the light receiving surface.

In a head lamp in accordance with the present invention, the second light guide member may include a side face connecting the light receiving surface to the light emitting surface, the side face having a surface containing a highly reflective metal.

In a head lamp in accordance with the present invention, the second light guide member may include a side face connecting the light receiving surface to the light emitting surface, the side face being composed of a member which has a different refractive index from the surroundings of the side face.

In a head lamp in accordance with the present invention, the second light guide member may be a convex lens.

In a head lamp in accordance with the present invention, the emission light conversion section may contain a fluorescent material.

In a head lamp in accordance with the present invention, the emission light conversion section may contain a scatterer.

A vehicle headlight in accordance with the present invention may be arranged to include any one of the illumination devices discussed above.

The present invention is not limited to the embodiments above, but may be altered by a skilled person within the scope of the claims. An embodiment based on a proper combination of technical means disclosed in different embodiments is encompassed in the technical scope of the present invention.

INDUSTRIAL APPLICABILITY

The present invention relates to illumination devices capable of projecting emission light onto a fixed position and is suitably applicable to, for example, vehicle headlights.

REFERENCE SIGNS LIST 1, 100, 200, 300, 400, 500 Head Lamp (Illumination Device)
2 Laser Element (Light Source)
3 Condenser Lens
4 Light Emitting Section (Light Conversion Section)
5 Parabolic Mirror (Light Distribution Section)
6 Convex Lens (Second Light Guide Section)
7 Metal Base
8 Fin
9 Scatterer
10 Optical Fiber (First Light Guide Section)
20, 21 Tapered Light Guide Section (Second Light Guide Section)
22 Light Guide Section of Rod Type (Second Light Guide Section)

The invention claimed is:

1. An illumination device, comprising:
a first light guide section and a second light guide section, which guide emission light emitted from a light source;
a light conversion section converting the emission light which has been guided by the first and second light guide sections to illumination light; and
a light distribution section controlling distribution of the illumination light thus converted,
the first light guide section having flexibility and guiding the emission light to the second light guide section,
a light guide path for the emission light in the second light guide section and the light distribution section being provided so as to be fixed relative to each other,
the first and second light guide sections each having (i) a receiving end part where emission light is received and (ii) an emitting end part where emission light is emitted,
the emitting end part of the first light guide section being provided near the receiving end part of the second light guide section,
the light conversion section being provided on a metallic member, and
the light conversion section being irradiated with the emission light at one surface thereof opposite to the metallic member.

2. The illumination device as set forth in claim 1, wherein the first light guide section is an optical fiber.

3. The illumination device as set forth in claim 1, wherein:
the light source is made up of a plurality of light sources;
the first light guide section includes a plurality of optical fibers each receiving emission light from a corresponding one of the plurality of light sources; and
the plurality of optical fibers have respective emitting end parts which form a bundle.

4. The illumination device as set forth in claim 1, wherein the emitting end part of the second light guide section has a cross-sectional area which is smaller than or equal to that of the receiving end part.

5. The illumination device as set forth in claim 1, wherein the second light guide section has a reflective material coating on its external surface which corresponds to a part forming the light guide path.

6. The illumination device as set forth in claim 1, wherein the second light guide section guides the emission light by means of total reflection, occurred due to a difference in refractive index between (i) a material which constitutes the second light guide section and (ii) surrounding environment.

7. The illumination device as set forth in claim 1, wherein the second light guide section is a convex lens which converges the emission light guided from the first light guide section onto the light conversion section.

8. The illumination device as set forth in claim 1, wherein the emitting end part of the first light guide section and the receiving end part of the second light guide section are fixed integrally.

9. The illumination device as set forth in claim 1, wherein:
the light source emits excitation light as the emission light; and
the light conversion section contains a fluorescent material which emits fluorescence upon receipt of the excitation light.

10. The illumination device as set forth in claim 1, wherein the light conversion section contains a scatterer which scatters the emission light guided by the second light guide section.

11. A vehicle headlight, comprising an illumination device as set forth in claim 1.

* * * * *